Inventor
ANKER E. KROGH

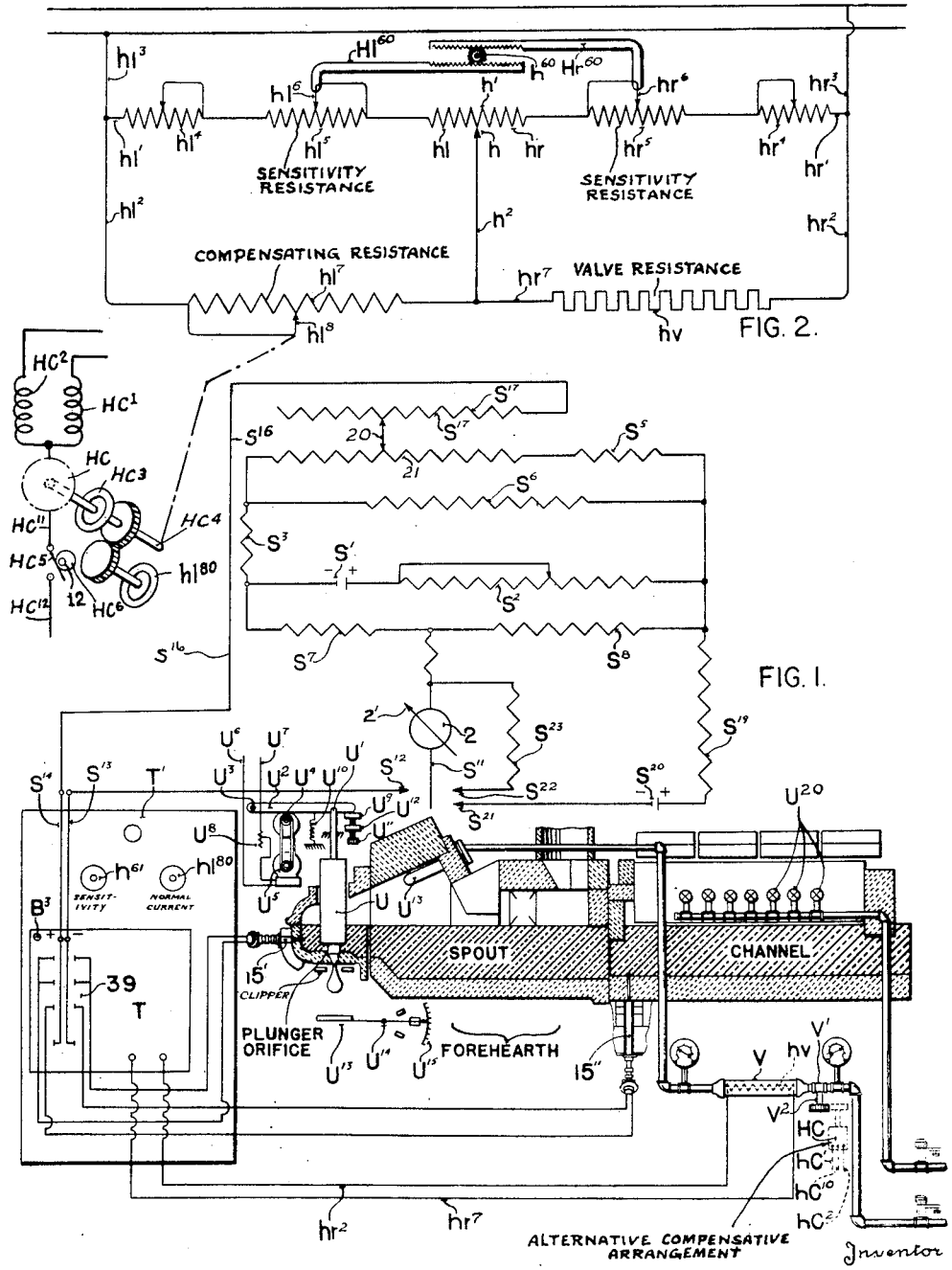

June 16, 1942.  A. E. KROGH  2,286,741
CONTROL APPARATUS
Original Filed Feb. 4, 1935  7 Sheets-Sheet 4
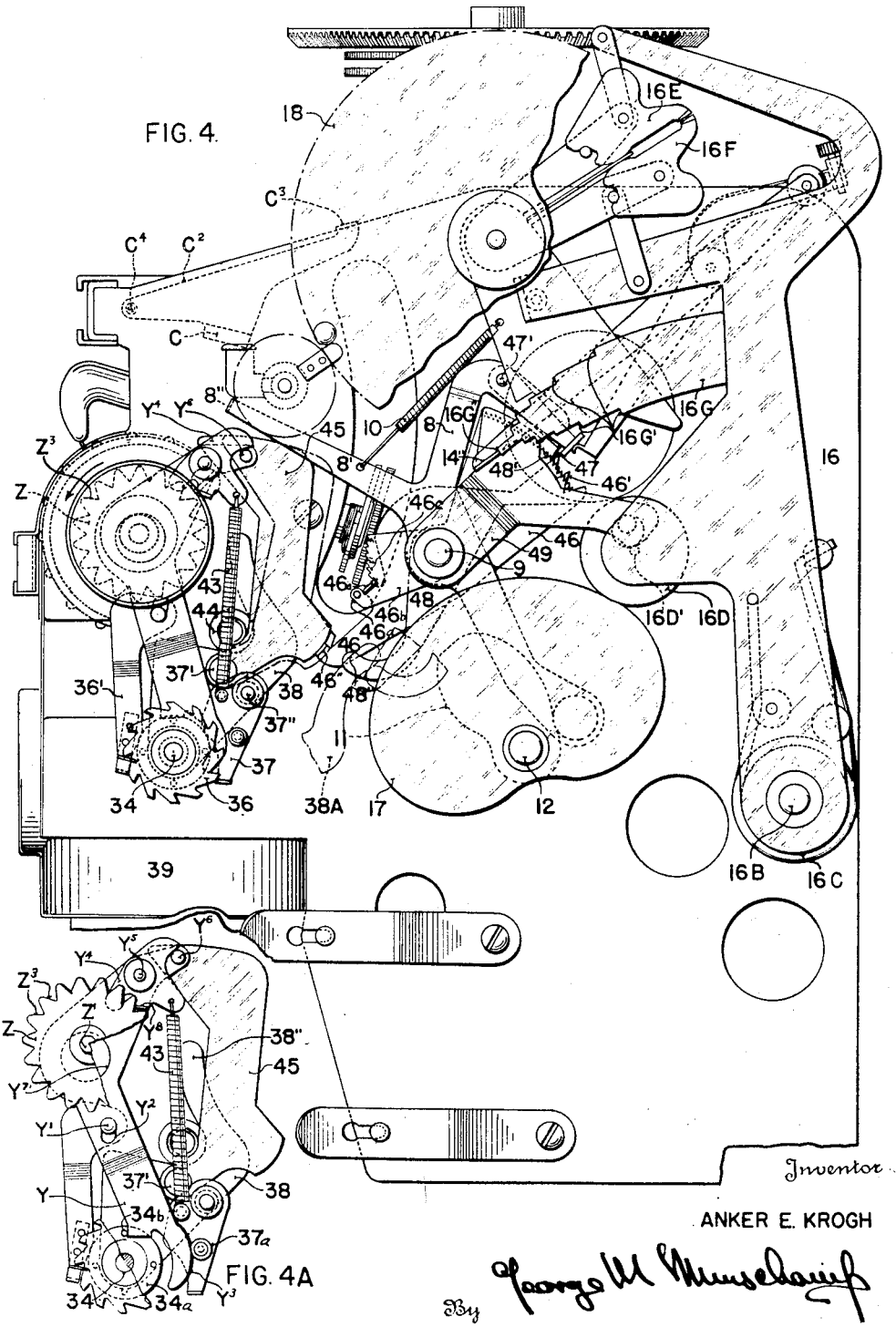
Inventor
ANKER E. KROGH June 16, 1942.  A. E. KROGH  2,286,741
CONTROL APPARATUS
Original Filed Feb. 4, 1935  7 Sheets—Sheet 6
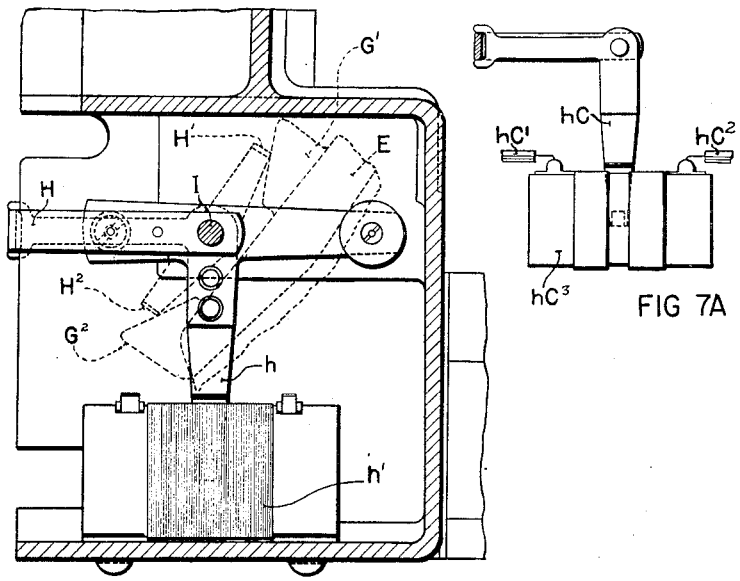
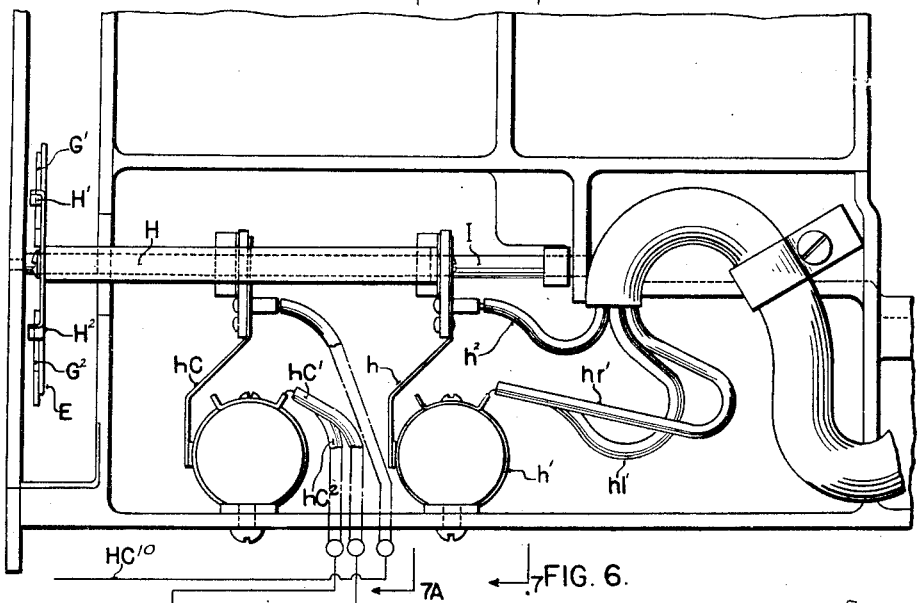
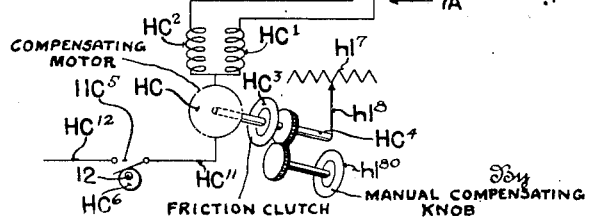
Inventor
ANKER E. KROGH
By George W. Musselman
Attorney June 16, 1942.   A. E. KROGH   2,286,741
CONTROL APPARATUS
Original Filed Feb. 4, 1935   7 Sheets-Sheet 7
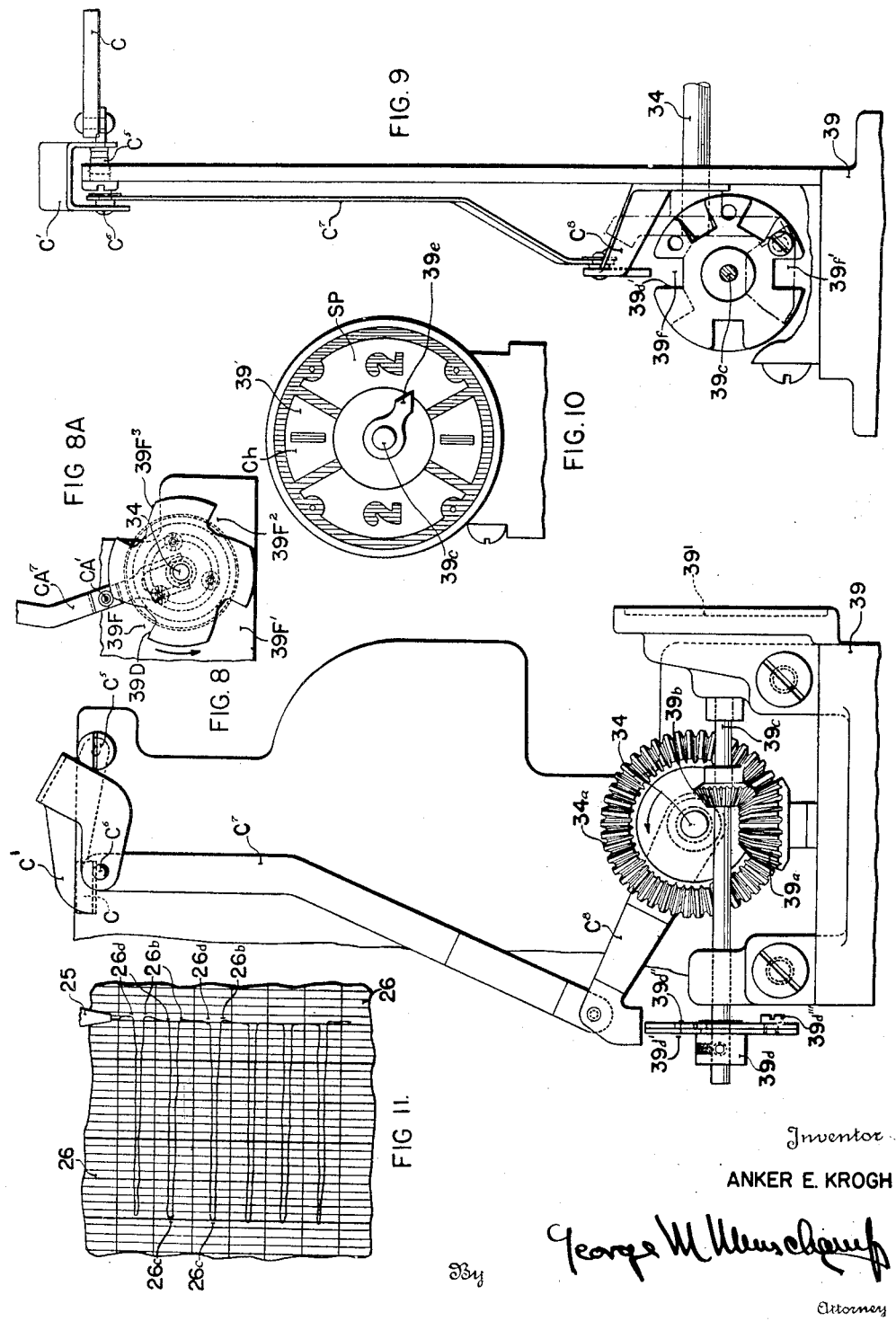
Inventor
ANKER E. KROGH
By George M. Munchamp
Attorney Patented June 16, 1942

2,286,741

UNITED STATES PATENT OFFICE 2,286,741

CONTROL APPARATUS

Anker E. Krogh, Philadelphia, Pa., assignor to The Brown Instrument Company, Philadelphia, Pa., a corporation of Pennsylvania Original application February 4, 1935, Serial No. 4,738. Divided and this application July 9, 1937, Serial No. 152,781

18 Claims. (Cl. 236—70)

A prior application, Serial No. 4,738, filed Feb. 4, 1935, by John P. Green, Coleman B. Moore, Roy Ullman, and myself, as joint inventors, granted as Patent No. 2,153,922 April 19, 1939, discloses and claims certain improvements in methods of and apparatus for control primarily devised for use in, and in connection with the operation of, a glass feeder intended to feed glass gobs sufficiently uniform in weight and temperature for use in the production of bottles and other glass articles in modern automatic glassware machinery. Said prior application discloses, and as originally filed, claimed certain novel electric control circuits, and certain novel arrangements for producing control effects in separate response to variations in two related variables which were not the joint invention of the applicants who made said prior application, but were my sole invention and are disclosed and claimed by me in the present application, which, under the circumstances, is to be regarded as a division of said prior application.

The general object of the invention disclosed and claimed herein, is to provide improvements in automatic control systems and particularly in a control system including an electric circuit network and means for unbalancing the circuit on a change in a controlling condition, and means automatically responsive to unbalance in the circuit for simultaneously effecting a control action correctively effecting the controlling condition, and a circuit adjustment which rebalances the control circuit.

The present invention is characterized in particular by provisions original with me for automatically effecting compensating adjustments in the control circuit, whereby the control system is adapted to maintain a controlling condition at an approximately constant predetermined value notwithstanding some variation in a condition of operation which, but for compensating adjustments effected, would result in the operation of the control system to maintain a different value of the control condition until the occurence of a further variation in the condition of operation.

The invention is characterized also by provisions for adjusting the control circuit to adjust what is sometimes referred to as the sensitivity of the control system to vary the magnitude of the control effect produced by a given change in the controlling condition.

The invention disclosed and claimed herein, is of especial utility for use in a control system in which the value of the controlling condition is measured by a self-balancing potentiometer measuring instrument constituting the primary controlling element of the control system.

The various features of novelty which characterize my invention are pointed out with particularity in the claims annexed to and forming a part of this specification. For a better understanding of the invention, however, its advantages and specific objects obtained from its use, reference should be had to the accompanying drawings and descriptive matter in which I have illustrated and described preferred forms of apparatus for use in the practice of the present invention.

Of the drawings:

Fig. 1 is a diagram illustrating a glass feeder mechanism and certain control and temperature measuring features associated therewith.

Fig. 2 is a diagrammatic representation of control circuit provisions adapted for use in the automatic adjustment of a thermally actuated control valve shown in Fig. 1;

Fig. 4 is an elevation of the end of the instrument partially shown in Fig. 3, which is at the right in Fig. 3;

Fig. 4A is an elevation, taken similarly to Fig. 4, showing parts of the instrument obscured in Fig. 4 by parts removed in Fig. 4A;

Fig. 6 is a rear elevation of a portion of the instrument shown in Fig. 3;

Fig. 7 is a section on the line 7—7 of Fig. 6;

Fig. 7A is a partial section on the line 7A—7A of Fig. 6;

Fig. 8 is an elevation ilustrating a detail of the instrument shown in Fig. 3;

Fig. 8A is an elevation illustrating a modification of Fig. 8;

Fig. 9 is an elevation of the apparatus shown in Fig. 8 with parts broken away and in section, as seen from the right of that figure.

Fig. 10 is an elevation of a portion of the apparatus shown in Fig. 8 as seen from the right of that figure; and Fig. 11 is a view showing a portion of a record sheet shown in Fig. 3 with the record lines formed thereon by the instrument.

Figure 2A:
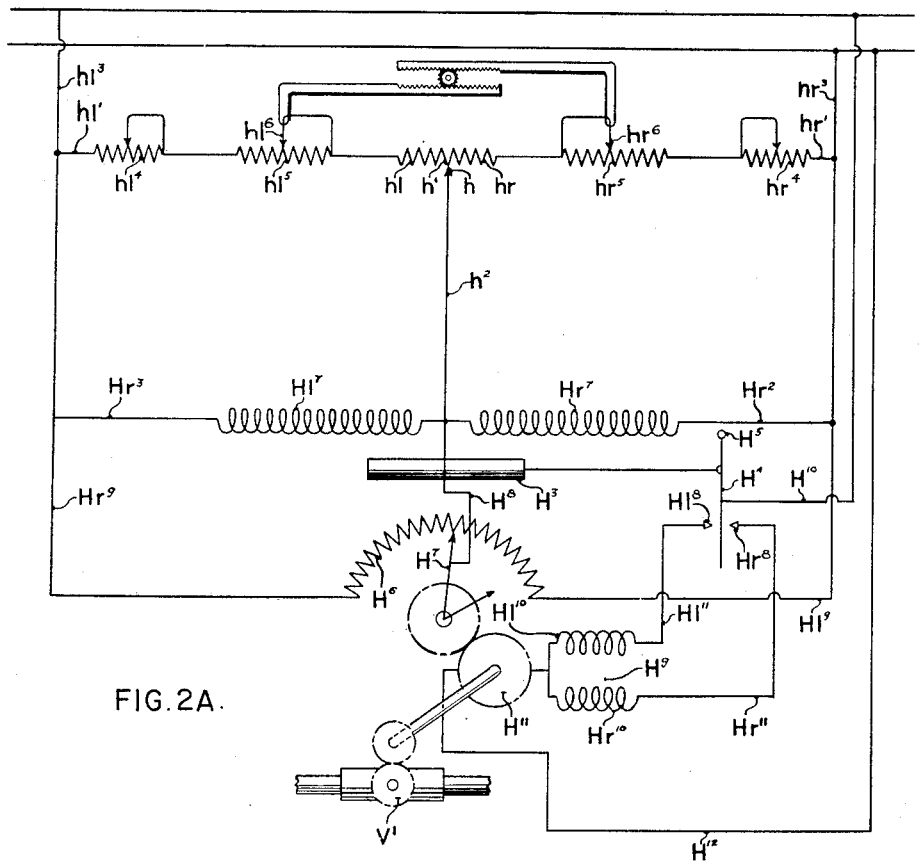
Fig. 2A is a diagram illustrating a modification of the control circuit shown in Fig. 2 adapted for use in adjusting a motor actuated control valve which may replace the thermally actuated control valve shown in Fig. 1.

In Fig. 1, I illustrate the use of my invention in connection with a glass feeder of known type adapted to deliver gobs of glass for use in bottle forming machinery not shown. The feeder comprises a glass receptacle structure, which is commonly referred to as a forehearth, and comprises two portions, one commonly called the channel and the other the spout. Molten glass is supplied to the channel portion of the feeder receptacle from a tank, not shown, and flows from the channel into the spout. The latter is provided with a submerged discharge orifice in its bottom wall in line with a vertically reciprocating plunger U which moves upward to open the orifice, and on each down stroke extrudes through the orifice a quantity of glass equivalent in amount to an individual gob, and at the conclusion of its down stroke, substantially closes the orifice. Clipper shears beneath the orifice and operating in timed relation with the plunger movements, periodically cut off the lower portion of the stream or attenuating body of glass depending from the orifice, to thereby form a glass gob for conveyance by suitable mechanism (not shown) to the bottle forming machinery.

The glass extruding plunger U, as shown, has a stem pivotally connected at U' to a plunger operating lever $U^2$ which is oscillated about its pivot $U^3$ by an eccentric $U^4$. The latter is continuously rotated about a stationary axis by an electro motor $U^5$, one of the energizing conductors, $U^6$ and $U^7$, of which includes a resistance $U^8$ which may be varied to vary the speed of the motor. The vertical movements given the lever $U^2$ by the cam $U^4$ have a fixed upper limit, but their lower limits are adjustable and are determined by the engagement of the lever with a stop $U^9$ carried by a vertical screw $U^{11}$ threaded through a fixed support $U^{12}$. The elevation of the stop $U^9$, and thereby the length of the stroke of the extruding plunger, may be adjusted by a rotation of the screw $U^{11}$ which may be effected automatically when desirable, but, as shown, is effected manually. With glass of a given viscosity, the amount of glass expelled on each plunger downstroke, and the size of the gob severed by the clipper, will depend on the length of the stroke of the plunger.

While the glass delivered to the forehearth from the tank is always molten, it is not practically feasible to maintain a feeder discharge which is high enough and constant enough by regulating the tank glass temperature, and the feeder is supplied with glass heating means. In the arrangement shown in Fig. 1, the heat supply means comprises manually adjustable fuel burners $U^{20}$ for supplying heat to the glass in the channel portion of the forehearth, and an automatically adjusted burner $U^{13}$ for supplying heat to the glass in the portion of the spout adjacent the discharge orifice.

In the preferred mode of use of the apparatus shown in Fig. 1, the burners $U^{20}$ are adjusted as required to supply a considerable portion of the feeder heat requirement but are not relied upon to maintain a constant channel glass temperature or to prevent that temperature from being substantially lower; ordinarily 100° or so lower than the desired glass temperature, and the burner $U^{13}$ is adjusted as required to raise the temperature of the glass adjacent the discharge orifice and prevent that temperature from departing more than a few degrees from a predetermined normal temperature and at the same time preventing change in that temperature, except at a rate so slow that ample time will be provided to determine the need for, and to effect the adjustments of the stop $U^{11}$ necessary to keep the individual glass gobs delivered practically uniform in weight and the adjustments of the bottle machinery necessary to compensate therein for the effect of changes in glass viscosity resulting from the changes in glass gob temperature. The desired glass temperature regulation requires suitable glass temperature measurements and, preferably, records of the measurements. In the apparatus shown, the temperature of the glass in the spout adjacent the orifice is measured by means including a thermocouple 15' extending through the spout wall with its tip in contact with the glass. The tip may be covered by a protecting tube or may be bare so as to be more quickly responsive to changes in temperature of the molten glass. A thermocouple 15'', which may be similar to the thermocouple 15', extends into contact with the glass in the channel. With the apparatus disclosed, the temperatures to which the two thermocouples are exposed are separately measured and are suitably recorded. In effecting adjustments of the extruding plunger strokes, and of the bottle making machinery, account should be taken not only of the spout temperature but of the subsequent effect on that temperature of the channel glass temperature. With the form of apparatus disclosed, the temperature measurements made by the use of the thermocouple 15'', may be taken into account in adjusting the burners $U^{20}$, but the burner $U^{13}$ is adjusted automatically in response to the measurements of the temperature to which the thermocouple 15' responds.

In the diagrammatic showing of Fig. 1, T represents the casing of a measuring, recording and control instrument mounted on a panel T', and to which the terminals of the thermocouples 15' and 15'' are connected, and which includes the circuit parts shown in Fig. 1. The instrument enclosed by the casing T, includes a switch 39 shown in detail in Figs. 8-10, which operatively connects the thermocouples 15' and 15'' alternately to the instrument and during a portion of the time in which the thermocouple 15' is operatively connected to the instrument, the latter subjects the thermally actuated valve V, regulating the supply of fuel to the burner $U^{13}$, to control effects dependent upon the then existing temperature of the thermocouple 15'.

The instrument enclosed by the casing T of Fig. 1, and the hereinafter described mechanical features, of which are shown by Figs. 3 to 8, is a self-balancing potentiometer instrument including a potentiometer measuring circuit which as shown diagrammatically in Fig. 1, is of conventional split potentiometer type. The potentiometer circuit of Fig. 1 includes a battery or other source of energizing current S' in series with a calibrating resistance $S^2$ in a circuit branch to the ends of which are connected three other circuit branches. One of the latter includes a slide wire resistance 21 and a ballast resistance $S^5$. The second of said three branch circuits includes a calibrating resistance $S^6$ which determines the measuring range of the potentiometer circuit, and the third includes ballast resistances $S^7$ and $S^8$. The circuit branches including the slidewire resistance 21 and the resistance $S^6$ are each connected at one end to one end of the branch including the battery S' through a ballast resistance S³. A galvanometer 2 has one terminal connected to the circuit branch including the resistances S⁷ and S⁸ intermediate of the latter, and has its other terminal connected to a switch part S'' which in the measuring condition of the apparatus engages a contact S¹² connected by a conductor to the potentiometer circuit terminal S¹³ of the switch 39. The cooperating potentiometer circuit terminal S¹⁴ is connected by a conductor S¹⁶ to one end of a slide wire resistance S¹⁷ alongside the slidewire resistance 21 and connected to the latter by a bridging contact 20. The latter is movable along the slidewire resistances to vary the point along the length of the resistance 21 at which the terminal S¹⁴ is connected to the latter, and to correspondingly vary the amount of the resistance S¹⁷ in circuit for the known purpose of preserving an approximately constant resistance in the galvanometer circuit.

If with the switch 39 adjusted to connect the terminals S¹³ and S¹⁴ to the terminals of one or the other of the thermocouples 15' and 15'', the voltage of the thermocouple so connected to the potentiometer circuit is equal and opposite to the potential difference between the portion of the slidewire resistance 21 then engaged by the contact 20 and the terminal of the galvanometer connected to the circuit branch including resistances S⁷ and S⁸, the potentiometer will be in balance, but not otherwise. When not in balance, the resultant deflection of the galvanometer pointer 2' will set into operation the instrument rebalancing mechanism to thereby automatically adjust the contact 20 along the slidewire resistance 21 until the potential difference between the points of the potentiometer circuit to which the thermocouple is connected is equal and opposite to the thermocouple, and the potentiometer is thereby balanced.

As those skilled in the art will understand, the resistance S⁷ may be of such value and have such a temperature coefficient as to compensate for variations in the thermocouple cold junction temperature. Fig. 1 conventionally illustrates calibrating provisions including a resistance S¹⁹, a standard cell S²⁰, a shunt resistance S²³ and switch contacts S²¹ and S²² into engagement with which the switch part S'' may be moved to determine the changes in the amount of the resistance S² in circuit required to compensate for changes in voltage of the energizing source S'. As the need for and mode of effecting such recalibration of the energizing circuit from time to time are well known, they need not be further referred to herein.

In respect to most of its potentiometer recording features, the instrument shown herein is similar in form, as well as in substance, to the instrument disclosed in Patent No. 2,150,502, granted March 14, 1939, on a joint application of Harrison, Grauel and Kessler, filed June 23, 1931, and in respect to a number of its control features, the instrument shown herein is similar to the instrument disclosed in the Harrison Patent No. 1,946,280 granted Feb. 6, 1934. The manner in which we make use of the features of said patents, and combine them with other control features, for the purposes of the present invention, is set forth in the following description of the construction and operation of the instrument disclosed herein.

The mechanical relay mechanism of the instrument shown which includes a driving shaft 12, constantly rotated by a driving motor, not shown, is controlled by the deflection of the galvanometer pointer 2' away from its normal zero position. The mechanism serves not only to periodically adjust the contact 20 as required to rebalance the potentiometer circuit, but also to move a pen or other recorder carriage 23 along a travelling record strip 26 to record the varying value of the quantity measured on said strip. The means for effecting control functions include a control table A, and means by which a control member, which in the form shown in Fig. 1, is a valve V controlling the supply of fuel to the burner U¹³, is periodically adjusted by the relay mechanism, if and when the recorded carriage 23 is then displaced in one direction or the other from the control table A. The latter is normally stationary but may be manually adjusted along the path of movement of the carriage 23 as by the rotation of the knob B³ shown in Fig. 1 and any suitable connection between said knob and table. The position of the control table A corresponds to, and determines the normal value, and the position of the carriage 23 corresponds to, and measures the current value of the quantity measured.

The mechanism through which the deflection of the galvanometer pointer 2' controls the adjustments of the recorder carriage 23 and the rebalancing of the potentiometer circuit on a variation in the quantity or value measured by the galvanometer, comprises a pointer engaging and position gauge element 3. The latter is pivotally supported and in connection with the hereinafter mentioned shaft 6 has a loading tendency, which may well be due partly to spring and partly to gravitational action, to turn upward into the position in which one or another of the shoulders 5 of the member 3 engage the pointer 2'. The element is engaged by, and turns, with the arm 6' of a rock shaft 6. A spring 10 tends to hold a rocker 8 which is journaled on a pivot 9, in the position in which the rocker engages an arm 7 secured to the shaft 6 and thereby holds the latter in a position in which the shoulders 5 are all below the pointer 2'.

Figure 3:
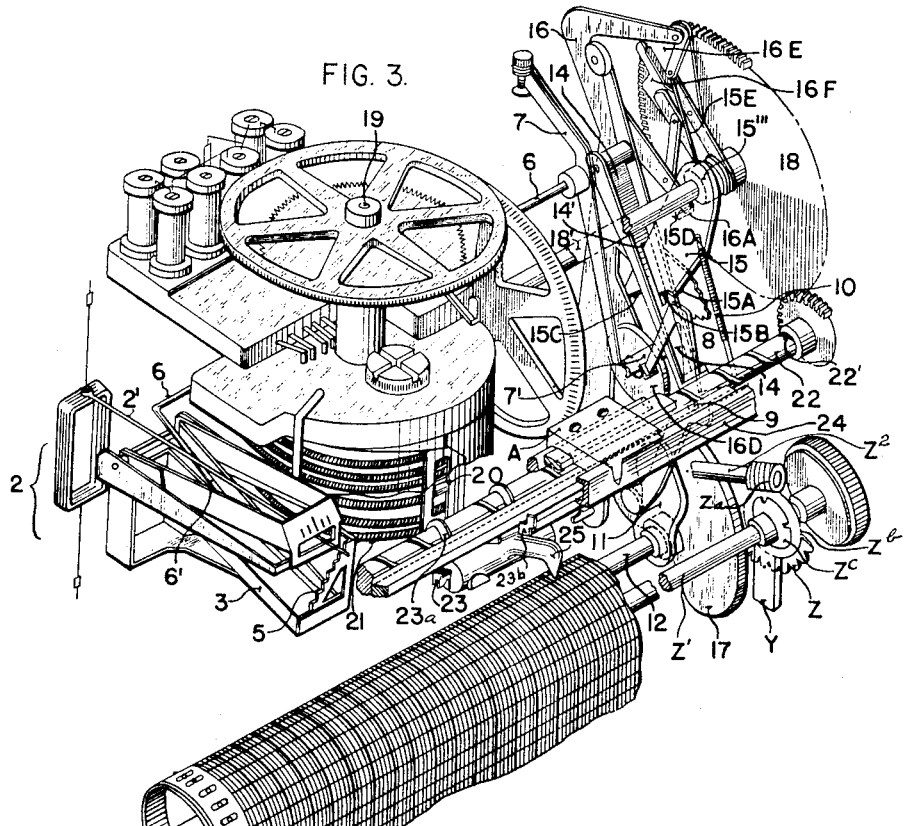
Fig. 3 is a perspective view of parts of a potentiometer measuring and control instrument diagrammatically shown in Fig. 1.

A cam 11 which is carried by shaft 12 constantly rotated by the instrument driving motor through a speed reduction gearing, turns the rocker 8 about its pivot against the action of the spring 10, once during each revolution. This allows the arm 7 to turn counter-clockwise, as seen in Fig. 3, until the corresponding angular movement of the shaft 6 is interrupted by the engagement of one or another of the shoulders 5 of the member 3 with the galvanometer pointer 2'. The shoulders 5 are so arranged that the turning movement of the shaft 6 and arm 7, thus permitted, will be greater or less according to the deflective position of the pointer 2' at the time. When the arm 7 thus turns counter-clockwise, a lateral projection 7' of that arm engages and turns a secondary pointer element 14 into a position corresponding to the then deflection of the pointer 2. The secondary pointer 14 is loosely journaled on the shaft 6, and has a gravital loading tendency to turn in the clockwise direction as seen in Fig. 3, so that the arm 14 normally bears against the projection 7' of the arm 7.

At the end of each angular adjustment of the secondary pointer 14 into a position corresponding to the then deflection of the galvanometer 2, one or another of the three shoulders 15A, 15B and 15C of a locking member 15, engages the bottom wall of a slot 14' in the member 14 and thereby frictionally holds the latter in the position occupied by it when such engagement occurs. When the pointers 2' and 14 occupy their neutral positions, the shoulder 15B of the member 15 comes into locking engagement with the member 14. When the galvanometer pointer 2' has deflected to the right, as seen in Fig. 3, as it does when the actual value of the quantity measured is lower than that indicated by the previously made and still existing potentiometer adjustment, the secondary pointer 14 is engaged and locked by the shoulder 15C. When the galvanometer pointer deflects in the opposite direction from its neutral position, as it does when the actual value of the quantity measured is higher than that indicated by the existing potentiometer adjustment, the pointer 14 is engaged and locked by the shoulder 15A of the member 15. The locking part 15 is given a tendency to move into locking engagement with the secondary pointer 14 by the spring 10, but is periodically held out of such engagement by the action on its projection 15D of a projection 16A carried by a ratchet lever 16 pivoted at 16B.

A spring 16C gives the lever 16 a tendency to turn forward in the clockwise direction, as seen in Fig. 3, but throughout the major portion of each rotation of the shaft 12 the lever 16 is held in a retracted position by a cam 17 carried by said shaft and engaged by the cam follower roll 16D carried by the lever 16. The ratchet lever 16 is operatively connected to two pawls 16E and 16F cooperating with a toothed wheel 18. Each of said pawls have a gravital tendency to occupy a position in which it does not engage the teeth of the wheel 18, but one or the other of the pawls is brought into engagement with the teeth of the wheel on each forward or clockwise movement of the lever 16, if the locking part 15 is then at one side or the other of the intermediate or neutral position which it occupies when the galvanometer pointer 2' is in its neutral position.

The position assumed by the part 15 when in locking engagement with the secondary pointer 14 controls the action of the pawls 16E and 16F by virtue of the fact that a collar or hub portion 15''' of the part 15 carries a spring pawl engaging arm 15E. The movement of the locking part 15 into the position in which its shoulder 15A engages the secondary pointer 14 causes the arm 15E to move the pawl 16E into operative engagement with the teeth of the ratchet wheel 18, and the clockwise or forward movement of the ratchet lever 16 then gives a clockwise adjustment to the ratchet wheel. Conversely, when the part 15 moves into the position in which its shoulder 15C engages the secondary pointer 14, the arm 15E shifts the pawl 16F into operative engagement with the wheel 18, and the latter is then adjusted in the counterclockwise direction.

The extent of the adjustment then given the wheel 18 is made dependent upon the position of the secondary pointer 14, as said position determines which of the various shoulders 16G' and 16G'' of an arm 16G carried by the lever 16 shall then engage a projecting portion 14'' of the secondary pointer 14 and thereby arrest the forward movement of the ratchet lever 16. In the neutral position of the galvanometer pointer and secondary pointer 14, the projection 14'' of the latter engages the central shoulder 16G'' of the arm 16G and the lever 16 is then held against any operative movement in the clockwise direction. When the secondary pointer position is more or less to one side or the other of its neutral position, the portion 14'' engages an upper or lower shoulder 16G' more or less distant from the central shoulder 16G'' and the lever 16 is then permitted more or less forward movement.

The rotation of the wheel 18 in one direction or the other effects corresponding potentiometer rebalancing adjustments and position adjustments of the recorder carrier 23. The rebalancing adjustments are effected by means of a rheostat shaft 19 which is geared to the shaft 18' on which the wheel 18 is secured. The rotation of the shaft 19 moves bridging contact 20 along the convolutions 21 of a potentiometer resistance helically disposed about the axis of the shaft 19, and thereby varies the amount of said resistance in the potentiometer circuit. The resistance adjustments made in response to a deflection of the galvanometer pointer in one direction away from its neutral position rebalances, or tends to rebalance, the potentiometer circuit and thereby returns, or tends to return, the galvanometer pointer to its neutral position.

The rotation of the wheel 18 adjusts the recorder carrier 23 by virtue of the fact that the teeth of the wheel 18 are in mesh with the teeth of a gear carried by a carriage adjusting shaft 22 which is in threaded engagement with the pen carriage. The shaft 22 is formed with a thread groove 22' of coarse pitch which receives a cam or mutilated screw thread rib 23' (see Fig. 5) secured to the carriage 23, so that the latter is moved longitudinally of the shaft 22 as the latter is rotated.

The marker carriage 23 comprises a frame portion formed of a single piece of sheet metal cut and bent to form a flat underbody portion with uprising projections. Those projections include two apertured ears 22a at the rear corners of said body portion transverse to and through which the shaft 22 extends; two projections 23b, one at each front corner of said body portion which bear against the inner edge and upper side of the lower flange of a channel bar or rail 24 forming part of the instrument framework, and three intermediate projections 23c which extend in vertical planes transverse to, and are arranged in a row parallel to, the shaft 22 and rail 24. In addition the body portion of the carriage frame is provided with a forwardly extending tongue passing beneath the rail 24 and terminating in an uprising pointer or index 23d adapted to cooperate with a scale marked on the front face of the rail 24 to indicate the position of the pen carriage, and the value of the quantity measured and recorded by the instrument.

The projections 23c support a small shaft 23e forming a support for a pen support 23f on which the pen 25 is pivotally supported with its marking end in engagement with a record sheet 26. The shaft 23e also supports parts cooperating with a bar 42 to effect adjustments of the pen support 23f which compensate for the expansion and contraction of the record sheet 26 caused by changes in atmospheric humidity. Such compensating provisions do not vary the position of the pen recorder carriage 23 though they vary the position of the pen or other marking element supported by said carriage, and form no part of the present invention and therefore need not be described herein.

The record sheet 26 passes over and is given feeding or advancing movements by a record feed roll 27. The latter is carried by a shaft Z' intermittently rotated by means, hereinafter described, actuated by the rocker 8 on each oscillation of the latter.

Figure 3A:
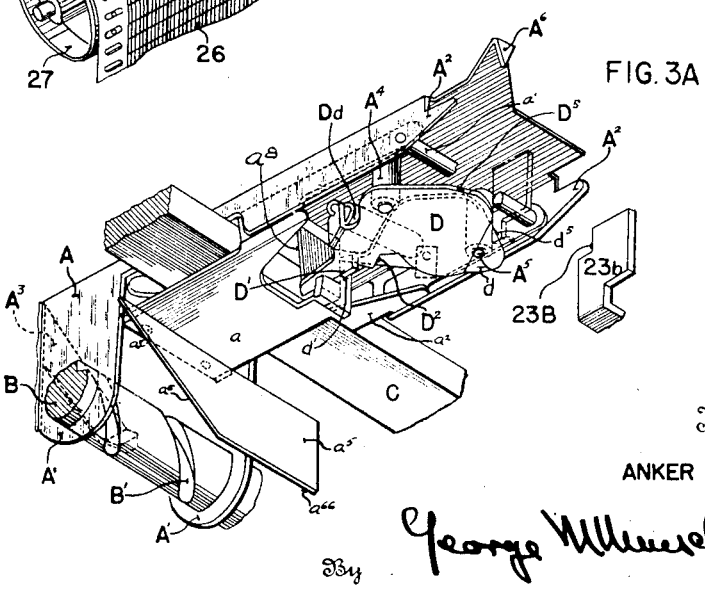
Fig. 3A is a perspective view of the control table and immediately related parts of the instrument shown in Fig. 3.

The control table A of the instrument shown in Figs. 3 and 3A comprises a sheet metal frame having ear portions A' apertured for the passage of a shaft B mounted in the instrument framework alongside the shaft 22 and having bearing parts A² which engage and slide along the upper flange of the rail 24. To facilitate the adjustment of the control table A along the path of travel of the pen carriage 23, the shaft B is shown as formed with a thread groove B' receiving a cam or mutilated thread rib part A³ secured to the control table frame. The shaft B may be rotated to adjust the control table in any suitable manner as by means of the transverse shaft geared to the shaft B and rotated by an operating handle or knob B³ at the front of the instrument, as shown in Fig. 1. An index A⁶ in conjunction with a scale on the front face of the rail 24 may indicate the adjustment of the table and the corresponding normal value of the quantity measured.

A member $a$ is hinged at one edge to the frame of the control table A by a pivot or pintle shaft $a'$ extending parallel to the shaft B. The member $a$ is formed with guiding provisions including a part $a^2$, for a bar-like part C which extends parallel to the shaft B and is rigidly secured at its ends to arms C' and C², which are pivotally connected to the instrument framework so that the yoke-like structure formed by the bar C and arms C' and C² may turn with respect to the instrument framework about an axis C⁴ coinciding with that of the hinge connection $a'$, between the table A and part $a$. The part $a$ and bar C are held by the said guiding provisions against independent turning movements about the axis of their respective pivotal supports. The part $a$ and bar C have a gravital tendency to move from their elevated positions, shown in dotted lines in Fig. 5, into or toward their lowermost positions. Their movement downward below their last-mentioned positions is prevented by the engagement of a projection C³ from the arm C² with an adjacent portion of the instrument framework. The parts $a$ and C are positively held in their uppermost positions by the action of a spring FA³, except during the portion of each revolution of the shaft 12 when the cam 11 renders the spring FA³ inoperative to prevent such movement, as is hereinafter described. The extent to which the parts $a$ and C are permitted to swing downwardly from their uppermost positions during each period when the action of the cam 11 renders the spring FA³ temporarily inoperative, depends upon the then relative positions of the table A and the recorder carriage 23, and upon other operating conditions later described. When the value of the quantity measured is so low that the carriage 23 is entirely at the low side (left-hand side, as seen in Fig. 3) of the control table A, the carriage 23 does not interfere with the movement of the parts $a$ and C into their lowermost positions.

When the current value of the quantity measured is suitably close to the normal value of that quantity, the control table and marker carriage 23 are in such relative positions that downward movement of the hinged part $a$ is prevented or restricted by the engagement of a portion of that part with the marker carriage 23. For the purposes of such engagement the part $a$, as shown in Figs. 3, 3A and 8, has a carriage engaging portion $a^5$ detachably secured to it. The part $a^5$ is in the form of a plate with a downwardly projecting body portion terminating in a lower oblique edge $a^6$, and having at its upper edge a lateral flange portion bearing against the under side of the part $a$ at the rear edge of the latter and detachably secured thereto by clamping screws $a^7$. The bodies of said screws pass through slots in the part $a$ which are open at the rear edge of the latter.

Figure 5:
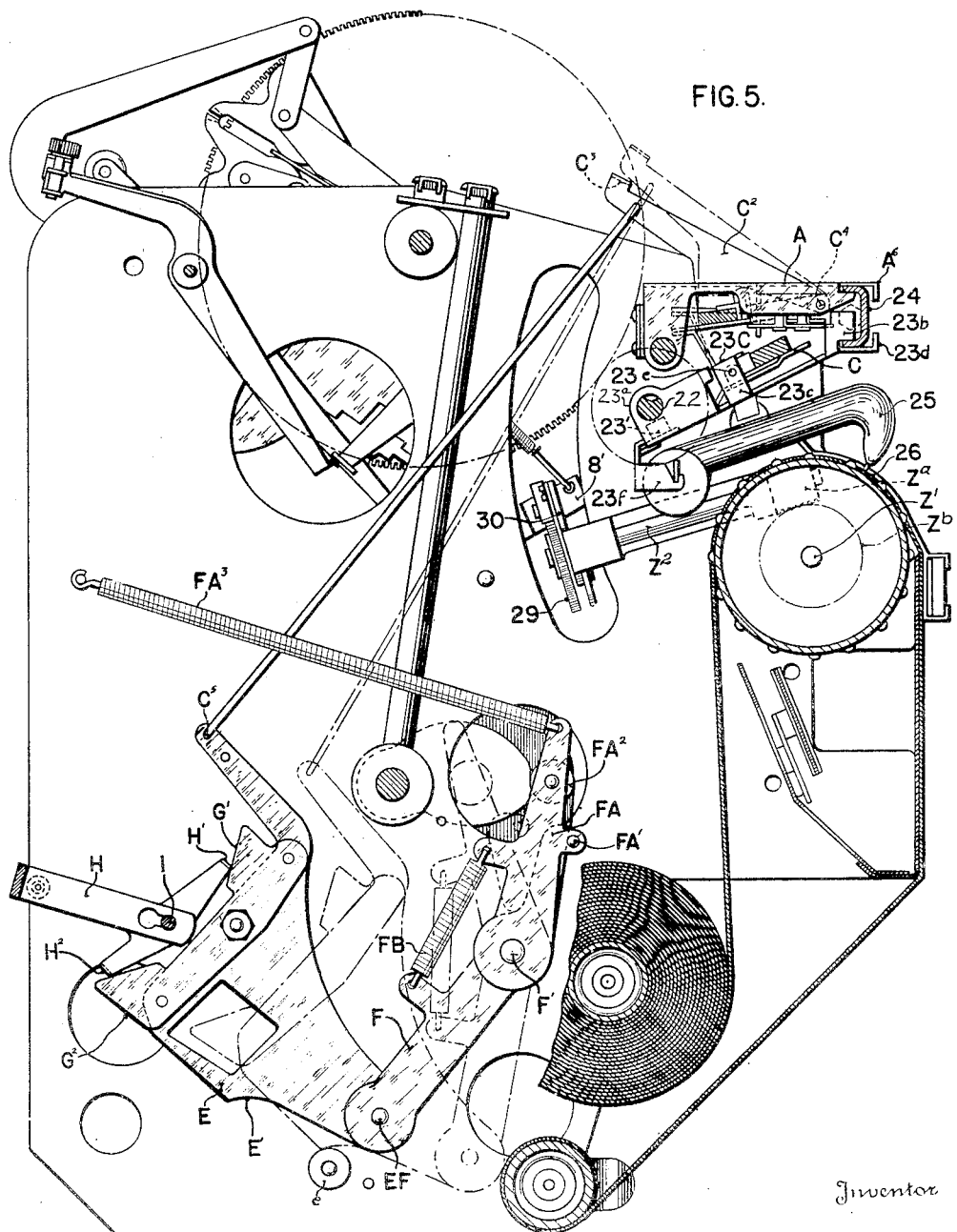
Fig. 5 is an elevation of the control instrument as seen from the left of Fig. 3, with parts broken away and in section.

The lower edge $a^6$ of the projection $a^5$ is so disposed that it may engage and rest upon the shoulder 23C formed by the upper edge of the projection 23c at the high side of the recorder carriage 23 (the righthand side, as seen in Fig. 3), when the position of said carriage is such as to hold the shoulder 23C beneath said edge $a^6$. When the indices 23d and $a^6$ coincide, indicating that the predetermined normal condition of the quantity then exists, the midpoint of edge $a^6$ will be directly over the right-hand edge of shoulder 23C. As the carriage 23 deflects above and below its normal position, the point of contact of shoulder 23C and edge $a^6$ varies so as to raise and lower bar C. The highest operative position of edge $a^6$ corresponds to the position in which horizontal edge $a^6$ of part $a$ contacts shoulder 23C. The dotted position of Fig. 5 is an inoperative or clearance position in which part $a$ cannot interfere in any way with the movements of the marker carriage which are given the latter while the part $a$ is held in said clearance position.

When an increase in the value of the quantity measured results in a movement of the recorder carriage 23 to the high side of the control table A, that movement causes the part $a$ to be positively secured against down movement from its uppermost operative position by adjusting latch member D, into its latching position. The latch D is pivotally mounted on a stud A⁴ depending from the underside of the plate-like body of the table A. In the latching position of the member D, a finger-like portion of the member extends beneath a portion $a^8$ of the part $a$ which is some distance to the rear of the hinge shaft $a'$.

Latch member D is automatically moved into and out of its latching position, as the carriage 23 moves to and returns from the high side of the control table A, by means which include a vertically disposed shoulder or edge 23B of the projection 23b at the low side front corner of the recorder carriage frame, a member $d$ pivotally mounted on a stud A⁵ depending from the underside of the control table frame alongside the stud A⁴, and a spring Dd connecting the members D and $d$. The spring Dd tends to move the member D in the counter-clockwise direction, as seen in Fig. 3A, and to move the member $d$ in the opposite direction about their respective pivotal supports A⁴ and A⁵; such turning movements of the members D and $d$ are prevented by the engagement of the finger portion $d'$ of the part $d$ with the shoulder D' of the member D, when the latter is in its latching position, as shown in Fig. 3A. In the non-latching position of the member D, the finger $d'$ engages a shoulder D² of the part D.

The members D and $d$ are moved from the latched position shown in Fig. 3A into the unlatched position and back again into the position shown in Fig. 3A by the engagement of the recorder carriage shoulder 23B with the cam-shaped front edges $D^5$ and $d^5$ of the members D and d, respectively. The edges $D^5$ and $d^5$ are so respectively shaped and disposed that as the carriage moves to the high side of the control table, the shoulder 23B acts on the edge $d^5$ to turn the member d counter-clockwise, as seen in Fig. 3A, so that the spring Dd may then move the member D into its latching position in which its shoulders D' engage the finger d'. When the carriage subsequently moves back from its high position, the shoulder 23B engages edges $D^5$ of the member D and moves the latter into its non-latching position while permitting the spring Dd to move the member d into the position in which its finger d' engages the shoulder $D^2$ of the member D, and holds the latter in its non-latching position.

The means through which the spring $FA^3$ normally prevents movement of the control table part a out of its clearance position, and through which the rising and falling movements of the bar C and part a effect control functions, include a floating member E connected by a link $C^5$ to the arm $C^2$, and parts associated with the member E. The latter is pivotally connected at EF to the part F of a compound lever comprising parts F and FA each pivoted to the instrument framework at F' and normally held against relative movement by a spring FB. The latter tends to hold the part F in engagement with a projection FA' of the part FA, but serves as a safety device which may yield to prevent injury of the parts in case the switch parts actuated by the member should jam; the spring $FA^3$ extends between the upper end of the lever part FA and the instrument framework, and tends to hold the parts F, FA and E in the positions shown in dotted lines in Fig. 5.

The lever part FA is moved from the dotted line position into the full line position of Fig. 5 once during each rotation of the shaft 12, by the cam 11, which then engages a cam roll follower $FA^2$ carried by the lever part FA.

When the parts are in the positions shown in dotted lines in Fig. 5, the lower can edge E' of the member rests upon a roller support e mounted on the instrument framework, and the position of the member E is then such that the link $C^5$ holds the part $C^2$ and thereby the bar C and control table part a in their uppermost positions. When the lever part F is turned in the clockwise direction from its Fig. 5 dotted line position, the weight of the part E adds to the gravital tendency of the bar C and table part a to turn downward, and the parts last mentioned then move downward into the position shown in full lines in Fig. 5, unless further movement is prevented by the control table latch D, or by the engagement of an edge of $a^5$ with the recorder carriage shoulder 23C.

The movement of the member E into the full line position shown in Fig. 5 adjusts a control element H about its stationary supporting shaft I into a position, unless already in that position, which corresponds to and is determined by the then existing elevation of the member E which is determined by the position at the time of the part $C^2$. The position of the member H following each advancing movement of the member E is made dependent on the elevation of the member E through the co-action of fingers G' and $G_2$ carried by the member E with lateral extensions H' and $H^2$ from an arm secured to the frame H and located at opposite sides of the shaft I. When the measured quantity is at its normal value, so that the shoulder 23C of the carriage 23 is in position to engage the midpoint of the oblique edge $a^6$ of the control table A, the oppositely inclined engaging edges of the fingers G' and $G^2$ so engage the fingers H' and $H^2$, respectively, as to turn the member H into its central or normal position, shown in Fig. 7, if not already in that position. When the carriage 23 is deflected to the right or the left of its normal value position as a result of the departure of the quantity measured above or below its normal value, the point of the control table edge $a^6$ engaging the carriage shoulder 23 will so raise or lower the member E that the fingers G' and $G^2$ and projections H' and $H^2$ will insure a position of the member H displaced clockwise or counter-clockwise, respectively, from the normal position illustrated in Fig. 7. Any deflection of the carriage 23 thus produces a corresponding change in the angular position of the frame H.

The frame H carries a contactor h in sliding engagement with a resistor h' shown as helically wound about a support extending parallel to the chord of the arcuate movement of the contactor h occurring as the member H is oscillated about the shaft I. One end of a conductor $h^2$ is connected to the contactor h and through the latter is connected to the resistor h' at a point along the length of the latter which depends upon the angular position of the frame H. The resistor h', contactor h, and conductor $h^2$ constitute part of a control circuit, of which one form is shown in Fig. 2 and a different form is shown in Fig. 2A, which is adapted to effect adjustment in the rate of heat supplied to the burner $U^{13}$ on a change in position of the contactor h resulting from a change in the glass temperature to which the thermo-couple 15' responds.

The control circuit shown in Fig. 2 comprises two branch circuits connected in parallel with one another to a source of current through supply conductors $hr^3$ and $hl^3$. The slidewire resistor h' is included in one of said branch circuits and the conductor $h^2$ connects the contact h to an intermediate portion $hr^7$ of the other branch circuit. Each of the two branch circuits thus forms two arms of a bridge circuit energized by the conductors $hr^3$ and $hl^3$ and comprising arms hr', hl', $hr^2$, and $hl^2$. The bridge arms hr' and hl' include relatively fixed resistances $hr^4$ and $hl^4$, respectively, which when once calibrated are not changed during the normal operation of the instrument. The arms hr' and hl' also include resistances $hr^5$ and $hl^5$ adapted for manual adjustment to vary the sensitivity of the control as hereinafter described. The resistor h' includes a portion hr in the arm hr', and has its remaining portion hl included in the arm hl'. The relative magnitudes of the portions hr and hl of the resistance h' depends upon and varies with the adjustment of the contactor h effected by the angular adjustment of the frame H. The bridge arm $hr^2$ includes the heating resistance hv of the thermally actuated valve V of known type shown in Fig. 1, and the arm $hl^2$ includes a resistor $hl^7$ which is adjustable by means of a sliding contact $hl^8$.

When a decrease in the spout temperature to which the thermo-couple 15' responds produces a deflection of the pen carriage 23 resulting in a movement of the contact h to the left as seen in Fig. 2, the resultant decrease in resistance of arm hl' relative to that of arm hr', results in resistance of arm $hl'$ relative to that of arm $hr'$, results in an increase in the current flow through the heating resistance $hv$ of the valve V, and gives an opening adjustment to the latter and thereby increases the fuel supply to the burner $U^{13}$. Conversely an increase in the spout temperature and an adjustment of the contactor $h$ to the right as seen in Fig. 2, and the resultant changes in the relative resistances of the arms $hr'$ and $hl'$ will decrease the current flow through the heating resistance $hv$ and subject the valve V to a closing adjustment.

In the operation of the apparatus shown, insofar as it has been described, on the atttainment of the predetermined normal spout temperature, the valve V will have a particular predetermined adjustment. Unless that adjustment is exactly the adjustment required for the supply by the burner $U^{13}$ of the amount of heat needed for the maintenance of the predetermined normal temperature, the latter will not be maintained. In practice, the amount of heat which the burner $U^{13}$ must furnish to maintain the predetermined normal temperature will vary from time to time. With the apparatus shown, the current flow through the resistance $hv$ and thereby the adjustment of the valve V, when the contact $h$ is in its neutral normal temperature position, may be varied by adjustment of the contact $hl^8$. Under certain conditions of use it is sufficient to provide means for effecting a manual adjustment only of the contact $hl^8$. Under other conditions, it is desirable to provide not only for the manual adjustment of the contact $hl^8$, but an automatic compensating adjustment of the contact, whereby on an increase or decrease of the spout temperature from its normal value, a suitable adjustment of the contact $hl^8$ will be made to thereby decrease or increase the normal current flow through the resistance $hv$ when the spout temperature is at its normal value.

The above mentioned compensating adjustment is effected with the form of apparatus shown, by means of a contact member $hC$ carried by the shaft I alongside the contact member $h$ and engaging one or another or neither of two conductors $hC'$ and $hC^2$ mounted on a support $hC^3$, accordingly as the shaft I is deflected in one direction or the other from, or is in its neutral position. The engagement of the contact member $hC$ with the conductor $hC'$, occurring on a fall in the spout temperature above its normal value results in the energization of a motor HC in the direction required to adjust the contact $hl^8$ to the right as seen in Fig. 2, and thereby increase the current flow through the resistance $hv$. To this end, as shown in Figs. 2 and 6, the motor HC includes a field winding $HC'$ connected in series with the conductor $hC'$ and the armature of the motor HC between motor energizing conductors $HC^{10}$ and $HC^{11}$. Conversely on a rise of the spout temperature above its normal value, the deflection of the contact member $hC$ into engagement with the conductor $hC^2$, completes an energizing circuit between the conductors $HC^{10}$ and $HC^{11}$ including a second field winding $HC^2$ in series with the conductor $hC^2$ and motor armature and the motor HC is energized in the direction to decrease the current flow through the valve resistance $hv$.

As the compensating adjustment normally required is small, and in any event may advantageously be effected intermittently, the conductor $HC^{11}$, in the arrangement shown, is energized by means of a switch $HC^5$ only when the latter connects the conductor $HC^{11}$ to a conductor $HC^{12}$. As shown, the switch $HC^5$ is actuated once during each rotation of the constantly rotating instrument shaft 12 by means of a switch actuating cam $HC^6$ carried by the shaft 12. With the arrangement shown diagrammatically in Figs. 2 and 6, the motor HC will be periodically energized and produce corresponding adjustment of the contacts $hl^8$ during the smaller portions of time in which the instrument is not operative for its normal control purposes, as well as during the larger portions of time in which the instrument is so operative. The automatic adjustment of the contact $hl^8$ during periods in which the instrument is not effecting its normal control functions is not seriously objectionable and ordinarily does not justify the slight additional instrument complication such as the inclusion of a second switch in series with the switch $HC^5$ and actuated, for example, by the means hereinafter described for operating the switch 39, so as to permit the motor HC to be energized only when the instrument is effecting its normal control functions.

As shown diagrammatically in Figs. 2 and 6, the armature shaft of the motor HC is connected to the shaft $HC^4$ carrying the contact $hl^8$ through a friction clutch $HC^3$, and the shaft $HC^4$ is gear connected to a knob $hl^{80}$ mounted in the instrument panel, and by means of which the contact $hl^8$ may be manually adjusted at any time.

As an alternative to the adjustment of resistor $hl^7$ through contacts $hC$, $hC'$ and $hC^2$ as just described to alter the normal current adjustment we may attain the same end of altering the normal fuel supply by direct mechanical actuation of valve V as shown in Fig. 1. In Fig. 1 we have indicated the motor HC in dotted lines as connected to a throttling valve V' governing the supply to valve V. The valve V' may be and in practice is formed integral with valve V and is provided with a shaft $V^2$ which we have shown as geared to reversible motor HC. The motor HC is energized as described in connection with Figs. 2 and 6. By this means the fuel flow to valve V is variably throttled and obviously a by-pass connection about valve V could be utilized to the same end.

In addition to the normal current adjustment just described and the normal temperature adjustment effected by operation of the knob $B^3$ to adjust the control table A along the path of the marker carriage 23, it is highly desirable to adjust the control circuit so as to vary the sensitivity of the control effect, i. e., to vary the change in the fuel supply to the burner $U^{13}$ resulting from a given change in the spout temperature to which the thermo-couple 15' responds. As shown in Fig. 2, the sensitivity adjustment is effected by simultaneously increasing or decreasing the amounts of the resistances $hr^5$ and $hl^5$ included in the bridge arm $hr'$ and $hl'$ respectively. To this end, as diagrammatically shown in Fig. 2, the contacts $hr^6$ and $hl^6$ by which the amounts of the resistances $hr^5$ and $hl^5$ in circuit are respectively adjusted, are carried by rack bars $Hr^{60}$ and $Hl^{60}$. The latter are at opposite sides of, and in mesh with a spur gear $h^{60}$ which may be rotated as by means of a knob $h^{61}$ mounted on the panel T'. Rotation of the gear $h^{60}$ in one direction will increase the amounts of the resistances $hr^5$ and $hl^5$ in circuit and thereby diminish the control sensitivity, and its rotation in the opposite direction will diminish the amounts of the resistances $hr^5$ and $hl^5$ in circuit and increase the control sensitivity. The sensitivity adjustment thus provided, permits of a wide variation in the range of adjustment of the fuel supply, and a consequent variation in the frequency of the swings in glass temperature resulting from changes in the glass spout temperature due to changes in the temperatures at which the glass is supplied to the channel or other causes extraneous to the control system and to the compensating and temperature restoring action of the burner $U^{13}$.

The advantage of the sensitivity adjustment provided for in the circuit arrangement of Fig. 2 may be obtained in other control circuits, and is obtained in the control circuit of Fig. 2A which is adapted for alternative use with the circuit of Fig. 2, in the apparatus of Fig. 1. The control circuit of Fig. 2A is employed to actuate a reversible motor $H^9$ for adjustment of a motor actuated fuel valve $V'$ which may be used in lieu of the two valves V and $V'$ of Fig. 1. The control circuit of Fig. 2A includes a bridge portion generally similar to the bridge of Fig. 2, but in which the arms $Hr^2$ and $Hr^3$ correspond to the arms $hr^2$ and $hl^2$ of Fig. 2, respectively. The arm $Hr^2$ and $Hr^3$ include resistance windings $Hr^7$ and $Hl^7$, respectively, which act inductively on and control the position of a floating armature $H^3$, which is held in an intermediate position or is shifted to the right or left, respectively, as seen in Fig. 2A, accordingly as the current flow through the winding $Hr^7$ is equal to, exceeds, or is less than the current flow through the winding $Hl^7$. The longitudinal movement of the armature $H^3$ away from its neutral position moves a contact $H^4$ pivoted at $H^5$ into engagement with a contact $Hr^8$, or a contact $Hl^8$, dependent on the direction of armature movement, neither of the last mentioned contacts being engaged by the contact $H^4$ when the armature $H^3$ is in its neutral position.

The motor $H^9$ is energized for rotation in one direction when the contact $H^4$ engages the contact $Hr^8$, through a circuit including supply conductor $H^{10}$, contact $H^4$, contact $Hr^8$, conductor $Hr''$, motor winding $Hr^{10}$ and supply conductor $H^{12}$. Movement of the contact $H^4$ into engagement with the contact $Hl^8$ energizes the motor $H^9$, for rotation of its armature $H''$ in the opposite direction through an energizing circuit similar to that just described except that it includes motor winding $Hl^{10}$, conductor $Hl''$ and contact $Hl^8$ in lieu of the motor winding $Hr^{10}$, conductor $Hr''$ and contact $Hr^8$.

The rotation of the motor $H^9$ in one direction or the other gives a corresponding angular adjustment to a contact $H^7$, the position of which thus corresponds to the position of the movable member of the valve $V'$. The contactor $H^7$ is connected by a conductor $H^8$ to the common junction of the windings $Hr^7$ and $Hl^7$, and engages, and is adjustable along a slidewire resistance $H^6$, which is connected in shunt to the bridge circuit branch including the arms $Hr^2$ and $Hr^3$.

In the normal position of the contactor $h$ corresponding to the normal value of the spout temperature, the floating armature $H^3$, the contactor $H^7$ and the movable member of the valve $V'$ will all be in, or move into, their normal midpositions. A change in the spout temperature resulting in an adjustment of the contactor $h$ will unbalance the current flows in the windings $Hr^7$ and $Hl^7$ and thereby set the motor $H^9$ in operation to effect the same kind of adjustment in the fuel supply to the burner $U^{13}$ as would result from the same adjustment of the contactor $h$ with the circuit arrangement of Fig. 2 provided that the sensitivity adjustment is the same in Fig. 2A as in Fig. 2. The arrangement of Fig. 2A differs from that in Fig. 2, however, in that the movement of the motor $H^9$ which adjusts the valve $V'$ also adjusts the contact $H^7$. The adjustment of the contact $H^7$ resulting from the operation of the motor $H^9$ tends to rebalance the current flow in the windings $Hr^7$ and $Hl^7$ and continues until rebalance is adjusted. In consequence, on any change in the control temperature and consequent change in the position of the contactor, $h$, the motor $H^9$ operates until the position of the movable valve member of the valve $V'$ and the position of the contactor $H^7$ are in predetermined correspondence with the position of the contactor $h$. What that correspondence may be depends upon the sensitivity adjustment of the circuit and is varied by a variation in that adjustment.

The above mentioned Patent No. 2,150,502 discloses a multiple recorder having provisions for intermittently printing independent records of various quantities. For the purpose of the present invention I advantageously employ so-called "pen dragging" means forming a continuous record line as shown in Fig. 11, different readily distinguishable portions of which show the spout and channel temperatures. Advantageously, and as shown, the time cycle of operation of the recorder controller instrument is divided into three stages which are respectively represented in Fig. 11 by consecutive curve portions 26b—26c, 26c—26d, and 26d—26b.

During the period or stage in which each curve section 26b—26c is being traced, the channel thermocouple 15'' is connected to the potentiometer measuring circuit and that period is terminated as soon as the instrument attains a predetermined condition or status hereinafter explained, which is assumed to and normally does insure a true measurement of the thermocouple voltage. At the termination of each of the periods or stages just referred to the switch 39 is actuated, as hereinafter explained, to disconnect the thermocouple 15'' from and to connect the thermocouple 15' into the measuring circuit. That condition or status is normally attained when a predetermined plurality of consecutive rebalancing operations occur without requiring adjustment of the pen carriage 23 and contact 20. With the considerable difference between the temperatures indicated on the chart by the lateral displacement of points 26b from the points 26c, a number of instrument rebalancing operations will occur as the pen is moving to the left, as seen in Fig. 11, from any point 26b to the following point 26c, but the adjustment of the pen carriage and contactor 20 effected at each rebalancing operation will be insufficient to fully balance the potentiometer circuit. After the pen point reaches the point 26c, which represents a true measure of the channel temperature, a small number of subsequent consecutive rebalancing operations can ordinarily occur without producing any adjustment of the carriage 23 and contactor 20, under the normal condition in which the channel temperature changes so slowly that time required for a large number of consecutive rebalancing operations may elapse before the channel temperature changes enough to require a change in measuring adjustment of the contactor 20 and carriage 23. The different points 26c thus collectively constitute a sufficient record of the channel temperature during the time in which those record points are formed.

The spout temperature measuring thermocouple 15' is connected to the potentiometer measuring circuit during each period or stage in which a curve section 26c—26d is being formed, and the latter is formed by instrument operations similar to those which result in the formation of a curve section 26b—26c.

With the particular form of mechanism disclosed, the shaft 34 is advanced a twelfth of a turn at the end of each stage during which a curve section 26c—26d is formed and thereby initiates the third stage represented by the corresponding curve section 26d—26b. As hereinafter explained, however, the character of the switch 39 is such that the replacement of the thermocouple 15' by the thermocouple 15" in the measuring circuit requires the two 30° movements of the shaft 34 at the beginning and end of the last mentioned period or stage. The latter would be completed sooner than is desirable but for means, hereinafter described, for rendering the means for rotating the shaft 34 inoperative during a predetermined time interval following the initiation of each stage in which a curve section 26d—26b is formed. During each stage represented by a curve section 26d—26b, control effects are produced dependent upon the spout temperature measurements then being recorded.

But for provisions now to be described, the instrument would produce undesired control effects during the periods in which the curve sections 26b—26c and 26c—26d are being formed. While the channel thermocouple 15" is connected into the measuring circuit control effects are not wanted, of course, since the control provided is responsive to the spout temperature only. Control actions while a curve section 26c—26d is being formed are undesirable because, as already explained, the instrument does not give a true measurement of the spout temperature until the section is practically completed.

For the particular use of the invention described it is desirable that the instrument should measure and record the spout temperature and produce control effects in accordance therewith throughout as large a portion of the time as is consistent with suitably frequent measurements of the channel temperature, and, as indicated in the chart, the fixed time interval corresponding to the distance longitudinally of the chart between each point 26d and the following point 26b is appreciably greater than that represented by the corresponding distance between each point 26b and the following point 26d. The last mentioned distance may vary somewhat since it corresponds, as will be apparent from what has been said, to the time required for a variable number of rebalancing operations.

The switch 39 which connects the thermocouple 15' and 15" alternately into the measuring circuit, is shown in Figs. 8 and 9 as mounted on the instrument side plate at the left hand side of the instrument as it appears in Fig. 3. The switch 39 may be of the type disclosed in the Harrison Patent 1,770,918, granted July 22, 1930, and is actuated by the rotation of a shaft 34, which in the form shown is given intermittent angular movements in the direction indicated by the arrow in Fig. 8, and each 30°. Twelve intermittent movements are thus required for a complete revolution of the shaft 34, and during each revolution of the shaft 34, therefore, the instrument completes its above mentioned three-stage cycle of operation four times. For the three-stage cycle operation described herein it would be possible to arrange for a complete revolution of shaft 34 in three steps instead of 12, but with the 12 steps the instrument has a desirable flexibility or adaptability for other uses. The switch contacts are carried by a shaft to which is fixed a gear 39a in mesh with and driven by a gear 34a carried by a shaft 34, the gear ratio being such that the switch shaft makes two revolutions for each revolution of the shaft 34. As will be apparent for the three-stage cycle operation described, the switch contacts must be so arranged that the thermocouple 15" will be connected into the measuring circuit while the gear 39a makes a sixth of a revolution and so that the thermocouple 15' will be connected into the measuring circuit during the subsequent movement of the gear 39a through a third of a revolution, after which the thermocouple 15" is again connected in the circuit while the gear 39a makes another sixth of a turn, etc. The periods during which the thermocouple 15" and 15' are in circuit are indicated by the movement of a pointer 39e along the arcs Ch and SP of the dial 39' shown in Fig. 10. The pointer 39e is carried by a shaft 39c on which is fixed a gear 39b in mesh with the upper end portion of the gear 39a, the gear ratio of gears 39a and 39b being 1 to 1.

The shaft 39c, which carries the pointer 39e at one end, carries at its end a control holdout device 39d comprising disc parts 39d' and 39d" which serve to hold the control instrumentalities out of operation except during the periods or stages in which curve sections 26d—26b are being formed and in which the pointer 39e is moving through along the second half of each dial arc SP. The disc parts 39d' and 39d" are provided with peripheral notches so related that the composite disc formed by the two parts 39d' and 39d" when clamped together by the clamping screw 39d''', will have one or more peripheral notches deepnding on the relative angular positions of the parts 39d' and 39d". For the particular instrument use illustrated herein, the two disk parts are relatively disposed to provide two diametrically opposed peripheral notches 39f and 39f' as is shown clearly in Fig. 9. During each control stage in which the pointer 39e is moving through the last half of each arc SP of the dial shown in Fig. 10, a lever C⁸ turning loosely on the shaft 34 may dip into one or the other of the notches 39f and 39f' while during the other stages similar down movements of the lever C⁸ are prevented by the engagement of the latter with unnotched portions of the composite disc periphery. The lever C⁸ is connected by a link C⁷ and pivot pin C⁶ to the previously mentioned arm C' which moves up and down with the control bar C. During the stages in which the curve sections 26b—26c—26d are being formed, the bar C is prevented from moving downward from a position which corresponds substantially to, but is slightly below its dotted line position shown in Fig. 5 by the engagement of the lever C⁸ with an unnotched peripheral portion of the device 39d. The elevated position in which the bar C and arm C² are then held, makes the elevation of the device E such that when the latter is advanced its fingers G' and G² pass above the control frame projections H' and H², respectively, and in consequence cannot then subject the frame H and contactor h to a control action.

An alternative means for elevating to and holding bar C in the raised position just described is shown in Fig. 8A. In Fig. 8A a cam 39D secured to shaft 34 is adapted to rotate with the latter and positively raise a link CA⁷ corresponding to link C⁷ of Fig. 8 thereby raising an arm C' to which it is pivoted at C⁶. The link CA⁷ is bifurcated at its lower end and surrounds a bushing secured to shaft 34 which bushing serves as a guide for the vertical motion of the link. A roller CA' carried by lever CA⁷ is adapted to ride on the edge of cam 39D in the latter of which is provided the depressions 39F, 39F', 39F² and 39F³ corresponding in purpose to depressions 39f and 39f' of Fig. 9. The lever CA⁷ is free to drop four times in each revolution of shaft 34 if the relation of table a and carriage 23 is such as to permit downward motion, the four stages in which roller CA' is opposite a depression in cam 39D corresponding to the controlling stage in which pointer 39e is at the latter portion of the arc indicated as SP in Fig. 10.

The mechanism through which the shaft 34 is given its successive 30° turning movements required for the production of the curve shown in Fig. 11, is illustrated in Figs. 4 and 4A, which are elevations of the instrument as seen from the side of the instrument opposite to that shown in Fig. 8. At the side of the instrument shown in Figs. 4 and 4A, a ratchet wheel 36 is secured to the shaft 34, a keeper 36' preventing counter-clock rotation of the ratchet wheel. The ratchet wheel 36 has 12 teeth and is advanced one tooth by a pawl 37 on each down stroke of the latter except when the pawl is held in an inoperative position by a pawl hold out lever Y which, as hereinafter explained, holds the pawl 37 in an inoperative position during the periods in which the record curve sections 26d—26b are being formed, as is hereinafter described.

The pawl 37 is pivoted at 37'', to a pawl lever 38, the latter being freely pivoted on shaft 34. A spring 43 tends to hold the pawl 37 against the periphery of the wheel 36 and normally holds the ratchet lever 38 in its uppermost position in which is bears against a fixed stop 44.

The ratchet lever 38 is turned clockwise from the position shown in Fig. 4 about the shaft 34 to advance the wheel 36 one tooth (i. e., one-twelfth of a revolution) on each oscillatory movement of the previously mentioned rocker 8 in the counter-clockwise direction occurring at a time in which a lever 46 holds a thrust member 45 in the full line position shown in Fig. 4 in which said member bears against a stop 44. In that position, the member 45, which is pivoted on the pivot pin 37', acts as a thrust block interposed between the pivot pin 37' and the projection 8'' at the end of the arm 8' of the rocker 8. The turning movement about the shaft 34 then given the lever 38 as the projection 8'' descends, carries the arm 38'' of lever 38 into the position 38A shown in dotted lines in Fig. 4, and in turning into its dotted line position, the arm 38'' engages the lower end 46'' of the lever 46 and the lower end 48'' of another lever 48 and turns those levers into the positions indicated by the dotted line positions of their lower ends shown in Fig. 4. As the rocker arm 8' makes its return up stroke, the spring 43 returns the lever 38 to its full line position, but does not effect a corresponding return movement of the lever 46. In consequence, the member 45 then is gravity held on its dotted line position shown in Fig. 4, in which it rests against pin 37'' carried by the lever 38, and in which its upper end is out of the path of movement of the projection 8''. No subsequent counter-clockwise rotation of the rocker 8 gives movement to the lever 38 and ratchet wheel 36 until the lever 46 is again returned to its full line position.

The lever 46 is returned to its full line position as a result of a plurality of rebalancing operations, said plurality varying from a minimum of two up to a predetermined but adjustable maximum which may well be from 6 to 20 or thereabouts, and which is fixed by means hereafter described. The levers 46 and 48 are mounted to turn about the supporting stud 9 for the rocker 8, and are so mounted as to have a frictional tendency to remain in the positions assumed by them until subjected to external forces displacing them from such positions. The lever 46 is returned to its full line position by the direct, indirect or partly direct and partly indirect action of a pawl 47 pivoted at 47' to an arm of the rocker 8. The direct action on the lever 46 of the pawl 47 occurs when the pawl engages with one or first with one and then with another of two teeth 46' carried by the upper end of the lever 46. The indirect action of the pawl 47 on the lever 46 results from the engagement by the pawl of the teeth 48' carried at the upper end of the lever 48 and the movement of the lower end of the latter against a projection 46a adjustably secured to the lever 46. Movement of the lever 48 under the action of the pawl 47 occurring after the lever has engaged the projection 46a, moves the lever 46 toward and may eventually move it into its full line position. The means for varying the number of teeth 48' by which it is necessary to move lever 48 before the lower end of lever 48 engages projection 46a, includes a notched sector 46b which carries projection 46a and which is pivoted at 9. One or another of notches 46c of sector 46b, according to the adjustment desired may be engaged by a projection 46d of lever 46 to thereby rigidly connect the projection 46a to the lever 46. In the adjustment shown in Fig. 4, twenty actuations of teeth 48' are required to move the block 45 into position for engagement by rocker arm 8' while but six such actuations would be required if the relative adjustment of lever 46 and sector 46b were such that uppermost tooth 46c engages projection 46d.

Whether or not on any particular clockwise rotation of the rocker 8 the pawl 47 will engage a tooth 46' of the lever 46 depends upon the position at the time of a tooth shielding member 49. The position of the member 49 at that time depends indirectly upon the position of the secondary pointer 14 and depends directly upon the position of the drive lever 16 when its advancing movement is arrested by the engagement of one of the shoulders of part 16G with the secondary pointer projection 14''. The position of the member 49 is so controlled as a result of the fact that it tends to turn clockwise under the action of gravity about the stud 9 to which it is pivotally connected and that its gravital movement is controlled by the engagement of a cam edge portion of the member 49 with an extension of the pivot pin 16D' on which the follower roll 16D is journalled.

In the neutral position of the secondary pointer 14'' and a perfect or approximately perfect condition of potentiometer balance in which the shoulder 16G'' engages the projection 14''', the part 49 is held in its uppermost position by the pin 16D'. The pawl 47 is then free to engage a tooth 48' and a tooth 46' at the beginning of its down stroke and to maintain such engagement until said stroke is completed. If in such case at the beginning of said stroke the lever 46 is in its position most remote from that shown in full lines in Fig. 4, the pawl 47 will then engage the lower tooth 46' and move the lever 46 into an intermediate position in which the pawl 47, on its following down stroke, can engage the second tooth 46', if the member 49 is then also in its uppermost position shown in Fig. 4. In such case the return of the member 46 to its full line position is effected by two potentiometer rebalancing operations and results from the direct action of the pawl 47 on the teeth 46'. While in such case the pawl 47 on each stroke would engage a tooth 48' of the lever 48 and give the latter the same turning movement as is given to the lever 46, the movement given to the lever 48 would not contribute to the return of the lever 46 to its full line position. From the foregoing, it will be apparent that in normal operation each actuation of the toothed wheel 36, effected through the parts 37 and 45 and the mechanism acting on the latter, institutes a new measuring period and terminates the measuring period which began with the previous actuation of the wheel 36 by the pawl 37, part 45 and mechanism acting on the latter. It will be noted further that each measuring period ends either when the measuring apparatus attains a predetermined measuring status, which, with the particular form of embodiment illustrated herein, is that resulting in perfect balance at two balancing operations during the measuring period, or at the end of a predetermined number of balancing operations when said status is not obtained with a smaller number of balancing operations.

When at the beginning of the down stroke of the pawl 47, the projection 14'' engages one of the upper or lower shoulders 16G' so that the pivot pin 16D' then occupies a position downward and to the left of that shown in Fig. 4, the member 49 will occupy a lower position in which it prevents the pawl 47 from engaging either tooth 46' or from engaging any tooth 48' until the down stroke of the pawl 47 is so nearly completed that it will advance the tooth 48' engaged, only for a distance corresponding to the distance between that tooth and an adjacent tooth 48'. If the series of rebalancing operations preceding each partial rotation of the ratchet wheel 36 includes none in which perfect balance is attained, the lever 48 will be advanced a tooth at a time until the predetermined number of such advances has caused the lever 48 to engage the projection 46a and move the lever 46 into its full line position. Whenever in that series of operations perfect balance is obtained, the next downstroke of the pawl 47 will directly move the lever 46 either into its said intermediate position or into its full line position and will correspondingly advance the lever 48. It will be apparent, therefore, that the lever 46 may be moved from its initial position into its full line position by the first two balancing operations of each if each of those operations results in perfect balance, or by any greater number of rebalancing operations including either one or two in which perfect balance is obtained up to a maximum number of rebalancing operations required for the return of the lever 46 by the advancement of the lever 48 one step at a time, in case perfect balance is not attained prior to the last down stroke of the pawl 47 required to return the lever 46 through the action of the lever 48.

The adjustment of the member 45 into the position shown in Fig. 4 during the stage in which the channel temperature is being measured results in the actuation of the shaft 34 which terminates that stage and initiates the second stage in which the potentiometer is balanced to measure the spout temperature. The movement of the member 45 into the Fig. 4 position during the last mentioned stage results in a movement of the shaft 34 which terminates that stage and initiates the third stage. The last mentioned movement of the shaft 34, while actually adjusting the switch 39, does not cut the thermocouple 15' out of and the thermocouple 15'' into the measuring circuit because of the switch characteristics already mentioned, but does advance the disc parts 39d' and 39d'' to bring one or the other of the notches 39f and 39f' into position beneath the lever $C^8$, so that the instrument may then perform its control functions effected during each third stage.

When the member 45 is brought into its Fig. 4 position during each third stage operation, it does not result immediately in a corresponding partial rotation of the shaft 34 because of the means previously mentioned and now to be described for rendering the provisions for rotating the shaft 34 inoperative for a predetermined time interval. The means last referred to comprise a masking member Y pivoted at Y', which when in its position shown in Fig. 4 is idle, but when in its position shown in Fig. 4A, has its cam edge $Y^3$ in engagement with a roller 37a on the pawl 37 and holds the latter away from the ratchet wheel 36. While the pawl 37 is so held away from the ratchet wheel 36, downstrokes of the member 45 and pawl 37 then produced are idle strokes and give no movement to the shaft 34. The masking member Y is moved from its position shown in Fig. 4 to its position shown in Fig. 4A at the beginning of each stage in which control actions are effected in accordance with spout temperature measurements by the engagement of the member Y by a corresponding one of four pins 34b carried by a disc 34a secured to the shaft 34, the pins being equally spaced about the axis of the shaft.

The previously mentioned spring 43, which is connected at its lower end to the pawl 37, is connected at its upper end to the member Y and subjects the latter to a yielding force constantly tending to turn the member Y about the pivot pin Y' in the clockwise direction as seen in Fig. 4. The spring 43 is advantageously connected to the member Y through a member $Y^4$ which is pivotally mounted on the pin $Y^5$ carried by the member Y. Except under conditions hereafter referred to, the spring 43 holds the member $Y^4$ against the stop pin $Y^6$ and acts on the member Y as though connected to a rigid portion of the latter.

In the preferred construction shown, the instrument includes means normally operating to return the member Y to its Fig. 4 position at the end of a predetermined time interval following each movement of the member out of that position, said means comprising a cam member Z which is in effect a ratchet wheel. The cam Z is secured to the chart drive shaft $Z^1$. The shaft $Z^1$ is rotated slowly and at an approximately constant speed in the counter-clockwise direction as seen in Fig. 4, and may be so rotated by any usual or suitable chart advancing mechanism. In the particular instrument shown, the shaft $Z^1$ is rotated by a shaft $Z^2$ (Fig. 5) carrying a worm $Z^a$ (Fig. 3) which drives a worm wheel $Z^b$ mounted on the shaft $Z^1$ and preferably connected to the latter through a friction drive part $Z^c$, so that while the shaft $Z^1$ normally rotates with the gear $Z^b$, it may be manually adjusted angularly relative to the latter, as is occasionally desirable in effecting the proper time setting of the record chart and for other purposes. In the form of construction shown, the shaft $Z^2$ is intermittently advanced by a pawl and latch mechanism actuated by the arm 8' of the rocker 8, but that mechanism need not be described in detail herein as it forms no part of the present invention and is described in the above mentioned Patent No. 2,150,502 and in the above mentioned Patent No. 1,946,280. While the motion given by the mechanism to the shaft $Z^1$ is intermittent, the periodicity or frequency of its intermittent movements is so great, relative to the slow record chart movement, that the latter may be regarded as substantially constant.

The cam Z acts on the member Y to return the latter from its Fig. 4A position to its Fig. 4 position, by virtue of the fact that the movement of the member Y into its Fig. 4A position swings a shoulder $Y^8$ carried by the member Y into position for entrance between two teeth $Z^3$ of the cam Z, so that as the latter rotates, the rear tooth may engage the shoulder $Y^8$ and lift the member Y. The lifting movement of the latter normally continues until its surface previously engaged by a pin 34b, as shown in Fig. 4A, is lifted above that pin. The tension of the spring 43 then turns the member Y into its Fig. 4 position which carries the shoulder $Y^8$ out of the path of the cam teeth $Z^3$. Advantageously, and as shown, the shoulder $Y^8$ is carried by the pivoted part which can turn counterclockwise about its pivot $Y^5$ against the tension of the spring 43 and thereby prevent the parts from jamming under certain conditions, as when it becomes desirable to give a manual reverse rotation to the chart shaft $Z^1$ while the shoulder $Y^8$ is entered between adjacent teeth $Z^3$ of the cam Z. In such case the counterclockwise movement of any tooth $Z^3$ engaging the shoulder $Y^8$ will cam the latter out of the path of the tooth. The arrangement also prevents jamming in case the movement of the member Y into its Fig. 4A position occurs at such a stage in the rotation of the cam Z that the shoulder $Y^8$ engages the tip of a tooth $Z^3$. In such case, the lifting movement of the member Y does not begin until the end of the short period required for sufficient movement of the cam Z to permit the shoulder $Y^8$ to enter the space back of the tooth $Z^3$ initially engaged.

As shown, the member Y is formed with an opening $Y^7$ through which the shaft $Z^1$ passes and which is sufficiently large to provide clearance for the described movements of the member Y relative to the shaft $Z^1$.

The return of the member Y to its Fig. 4 position renders the part 45 operative on its next downstroke to advance shaft 34, thereby terminating the third stage of the operating cycle and initiating the first stage of the following operating cycle. The return of the member Y to its Fig. 4 position leaves the pin Y' in an intermediate portion of the length of the slot $Y^2$, as the member Y is then held above its lowermost position by the pin 34b which had turned the member Y into its Fig. 4A position. As the shaft 34 is angularly advanced thereafter, the movement of the pin last mentioned permits the member Y to descend into position for engagement by the following pin 34b, when the member Y is next to be advanced into its Fig. 4A position.

As will be apparent to those skilled in the art, the apparatus disclosed herein comprises features novel with me and useful for other purposes than the practice of the preferred method disclosed herein. In particular, it is to be noted that in the operation of glass gob forming apparatus of the general character disclosed herein but including no automatic control provisions, measuring and recording means capable of producing a record of the character illustrated in Fig. 11 are highly desirable. That record includes a sufficiently good and continuous record of the channel temperature, and its production requires only relatively brief, infrequent, and unobjectionable interruptions in the measurement and recording of the more important and critical spout temperature. Such a record of the two temperatures as is shown in Fig. 11, is of itself sufficient to provide a guide for a manual control of the gob and article forming devices more effective and resulting in better operative results than was heretofore practically obtainable.

The record curve shown in Fig. 11 is typical of the results obtained in the regular commercial use of the invention, in the form illustrated diagrammatically in Figs. 1 and 2, in an installation in which the conditions of operation are such that the normal spout temperature is substantially higher than the usual channel temperature, and in which the spout temperature departure from the predetermined normal spout temperature ordinarily does not exceed a couple of degrees or so, and in which the duration of each spout temperature control interval, represented by each curve section $26^d$—$26^b$, is approximately ten minutes. In such use of the invention, as Fig. 11 indicates, several of said control intervals occur in regular operation between the instant at which the spout temperature begins to change in one direction, and the following instant at which the spout temperature begins to change in the opposite direction. During each control period in which the spout temperature is not at its normal value, a plurality of control adjustments of the burner $U^{13}$ are automatically effected in regular operation.

As those skilled in the art will understand, use of the invention is not restricted to installations in which the operating conditions are similar or even analogous to those just described, but my method of controlling the operation of a glass feeder is broadly characterized, in general, by the fact that it insures a slow swing, or reversal in the direction of change, of the spout temperature, so that ordinarily there is time for a considerable number of successive measurements of the spout temperature, and corresponding adjustments of the fuel supply to the burner $U^{13}$, during each interval in which the spout temperature is either continuously rising or continuously falling. This means, of course, that the tendency to a change in the spout temperature produced by each adjustment of the burner $U^{13}$ or other device employed to modify the spout temperature, must be sufficiently small so that ordinarily a considerable number of such adjustments are required to correct for such a small departure of the spout temperature from its normal value as one degree.

While in accordance with the provisions of the statutes, I have illustrated and described the best forms of embodiment of my invention now known to me, it will be apparent to those skilled in the art that changes may be made in the forms of the apparatus and methods disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. In a control system, a control circuit including a source of current, two circuit branches connected in parallel with one another and each in series with said source, and a cross connector adjustable to connect an intermediate point of one of said branches to the other branch at a point variable along the length of the latter, each of said branches including resistance at each side of its connection to said cross connector and the relative amounts of the resistances in the portions of said other branch at opposite sides being varied by adjustment of the latter, and means operable to simultaneously increase or decrease the amounts of resistance in said portions.

2. In a control system, a control circuit including a source of current, two circuit branches connected in parallel with one another and each in series with said source and a cross connector adjustable to connect an intermediate point of one of said branches to the other branch at a point variable along the length of the latter, each of said branches including resistance at each side of its connection to said cross connector and the relative amounts of the resistances in the portions of said other branch at opposite sides of its point of connection to said cross connector being varied by adjustment to the latter, means operable to simultaneously increase or decrease the amounts of resistance in said portions and control means responsive to changes in current flow in said one branch.

3. In a control system, a control circuit including a source of current, two circuit branches connected in parallel with one another and each in series with said source and a cross connector adjustable to connect an intermediate point of one of said branches to the other branch at a point variable along the length of the latter, each of said branches including resistance at each side of its connection to said cross connector and the relative amounts of the resistances in the portions of said other branch at opposite sides of its point of connection to said cross connector being varied by adjustment to the latter, means operable to simultaneously increase or decrease the amounts of resistance in said portions, and electrical control means responsive to changes in current flow in said one branch comprising a conductor forming a part of the resistance in said one branch.

4. In a control system, a control circuit including a source of current, two circuit branches connected in parallel with one another and each in series with said source and a cross connector adjustable to connect an intermediate point of one of said branches to the other branch at a point variable along the length of the latter, each of said branches including resistance at each side of its connection to said cross connector and the relative amounts of the resistances in the portions of said other branch at opposite sides of its point of connection to said cross connector being varied by adjustment to the latter, means operable to simultaneously increase or decrease the amounts of resistance in said portions, and a thermally actuated control valve having a heating resistance included in the portion of said one branch at one side of said intermediate point.

5. In a control system, a control circuit including a source of current, two circuit branches connected in parallel with one another and each in series with said source and a cross connector adjustable to connect an intermediate point of one of said branches to the other branch at a point variable along the length of the latter, each of said branches including resistance at each side of its connection to said cross connector and the relative amounts of the resistances in the portions of said other branch at opposite sides of its point of connection to said cross connector being varied by adjustment to the latter, means operable to simultaneously increase or decrease the amounts of resistance in said portions, and control means actuated by changes in the relative magnitudes of the currents flowing through the portions of said one branch at opposite sides of its connection to said cross connector.

6. In a control system, a control circuit including a source of current, two circuit branches connected in parallel with one another and each in series with said source, and a cross connector adjustable to connect an intermediate point of one of said branches to the other branch at a point variable along the length of the latter, each of said branches including resistance at each side of its connection to said cross connector and the relative amounts of the resistances in the portions of said other branch at opposite sides of its point of connection to said cross connector being varied by adjustment of the latter, means operable to simultaneously increase or decrease the amounts of resistance in said portions, a reversible control motor, means dependent on the relative current flows in the portions of said one branch at opposite sides of said intermediate point for operating said motor in one direction or the other when the current flow in the portion of said one branch at one side of said intermediate point rises above or falls below the current flow in the branch portion at the opposite side of said intermediate point.

7. In a control system, a control circuit including a source of current, two circuit branches connected in parallel with one another and each in series to said source, and a cross connector adjustable to connect an intermediate point of one of said branches to the other branch at a point variable along the length of the latter, means for varying said point in accordance with variations in a control quantity each of said branches including resistance at each side of its connection to said cross connector and the relative amounts of the resistances in the portion of said other branch at opposite sides of its point of connection to said cross connector being varied by adjustment of the latter, means operable to simultaneously increase or decrease the amounts of resistance in said portions, a control means dependent on the relative current flows in the portions of said one branch at opposite sides of said intermediate point for producing control effects selectively dependent upon the relative current flows in the portions of said one branch at the opposite sides of said intermediate point, and a reversible compensating control motor automatically actuated on a departure of the first mentioned point from a normal position thereof for effecting compensating control effects.

8. In a control system, a control circuit including a source of current, two circuit branches connected in parallel with one another and each in series with said source, and a cross connector adjustable to connect an intermediate point of one of said branches to the other branch at a point variable along the length of the latter, each of said branches including resistance at each side of its connection to said cross connector and the relative amounts of the resistances in the portions of said other branch at opposite sides of its point of connection to said cross connector being varied by adjustment of the latter, means operable to simultaneously increase or decrease the amounts of resistance in said portions, a reversible control motor, means dependent on the relative current flows in the portions of said one branch at opposite sides of said intermediate point for operating said motor in one direction or the other when the current flow in the portion of said one branch at one side of said intermediate point rises above or falls below the current flow in the branch portion at the opposite side of said intermediate point, a third circuit branch connected in parallel with said one branch and including a resistor, a contactor movable along said resistor resistance, a connection between said contactor and the intermediate point of said one branch, and means actuated by the motor for adjusting said contactor to make said current flows equal following each adjustment of said cross connector making said current flows unequal.

9. Measuring and control apparatus comprising normally balanced measuring means including automatic rebalancing means, means for connecting said measuring means alternately to two devices producing separate measurable effects adapted to unbalance said measuring means and thereby actuate said automatic rebalancing means to rebalance said measuring means during intervals which are longer for one device than for the other, and means for effecting a control action during each longer interval only, which control action is dependent on the value of the effect then being measured, the shorter interval being only long enough for measuring, whereby for any complete cycle of intervals the duration of the control action interval is a maximum.

10. Measuring and control apparatus comprising normally balanced measuring means including automatic rebalancing means, mechanism for connecting said measuring means alternately to two devices producing separate measurable effects adapted to unbalance said measuring means and thereby actuate said automatic rebalancing means to rebalance said measuring means, means dependent upon the attainment of measuring balance for automatically actuating said mechanism immediately following each measurement of one of said effects and after a predetermined time interval following each measurement of the other effect, and means for effecting a control action during said time interval dependent on the value of the effect then being measured.

11. Measuring apparatus comprising normally balanced measuring means including automatic rebalancing means, mechanism for connecting said measuring means alternately to two devices producing separable measuring effects adapted to unbalance said measuring means and thereby actuate said automatic rebalancing means to rebalance said measuring means, and means automatically dependent on the attainment of measuring balance adapted to actuate said mechanism less promptly after the attainment of said balance, in measuring one of said effects than in measuring the other of said effects.

12. Measuring apparatus comprising normally balanced measuring means including automatic rebalancing means, mechanism for connecting said measuring means alternately to two devices producing separable measuring effects adapted to unbalance said measuring means and thereby actuate said automatic rebalancing means to rebalance said measuring means, means automatically dependent on the attainment of measuring balance adapted to actuate said mechanism on the attainment of said balance, and automatic means for rendering the last mentioned means inoperative for a predetermined time interval following the attainment of balance in measuring one but not the other of said two effects.

13. Measuring and control apparatus comprising normally balanced measuring means including automatic rebalancing means, mechanism for connecting said measuring means alternately to two devices producing separable measuring effects adapted to unbalance said measuring means and thereby actuate said automatic rebalancing means to rebalance said measuring means, means automatically dependent on the attainment of measuring balance adapted to actuate said mechanism on the attainment of said balance, automatic means for rendering the last mentioned means inoperative for a predetermined time interval following the attainment of balance in measuring one but not the other of said two effects, and control means for effecting a control action during said time interval.

14. Measuring and control apparatus comprising normally balanced measuring means including automatic rebalancing means, mechanism controlled by said measuring means for connecting said measuring means alternately to devices producing separate measurable effects adapted to unbalance said measuring means and thereby actuate said automatic rebalancing means to rebalance said measuring means dependent upon the attainment of measuring means balance on the measurement of each effect, and means for producing control effects following and in accordance with the measurements of one only of said effects.

15. Measuring and control apparatus comprising normally balanced measuring means including automatic rebalancing means, mechanism controlled by said measuring means for connecting said measuring means alternately to devices producing separate measurable effects adapted to unbalance said measuring means and thereby actuate said automatic rebalancing means to rebalance said measuring means dependent upon the attainment of measuring means balance on the measurement of each effect, control means adapted to be actuated on each operation of said mechanism, and means rendering said control means inoperative during the measurement of one of said effects.

16. In a control system, a control circuit including a source of current, two circuit branches connected in parallel with one another and each in series with said source, and a cross connector adjustable to connect an intermediate point of one of said branches to the other branch at a point variable along the length of the latter, each of said branches including resistance at each side of its connection to said cross connector and the relative amounts of the resistances in the portions of said other branch at opposite sides of its point of connection to said cross connector being varied by adjustment of the latter, means operable to simultaneously increase or decrease the amounts of resistance in said portions and means for varying the resistance in said one branch.

17. In an electric control system, a bridge circuit including two adjustable resistance devices, each adapted by its adjustment to subject said bridge to a balance disturbing effect, means responsive to the direction of departure of a control quantity from a predetermined normal value of said quantity, and adapted to adjust one of said devices in accordance with said direction of departure, a reversible electric motor and means including a yielding connection through which said motor is adapted to adjust the second of said devices, controlling means for said motor actuated by the first mentioned means and adapted to operate said motor in selective accordance with the direction and duration of said departure, means permitted by said yielding connection for manually adjusting said second device, and control means under control of said circuit and adapted to exert an aggregate control action dependent in magnitude upon the effects produced by the said adjustments of the two devices.

18. In an electric control system, a bridge circuit including two adjustable resistance devices, each adapted by its adjustment to subject said bridge to a balance disturbing effect, automatic means operative on a change in a control quantity to adjust one of said devices in selective accordance with said change, automatic compensating means normally operative on a departure of said quantity from a normal value thereof to effect an adjustment of the second of said devices in selective accordance with the direction of said departure, manual means operable to render said automatic compensating means temporarily inoperative and to adjust the last mentioned device, and control means under control of said circuit and adapted to exert an aggregate control action dependent in magnitude upon the effects produced by the said adjustments of the two devices.

ANKER E. KROGH.